May 26, 1931.  E. S. GERRY  1,806,897
HEADLIGHT FOR AUTOMOBILES
Filed May 25, 1929   3 Sheets-Sheet 1
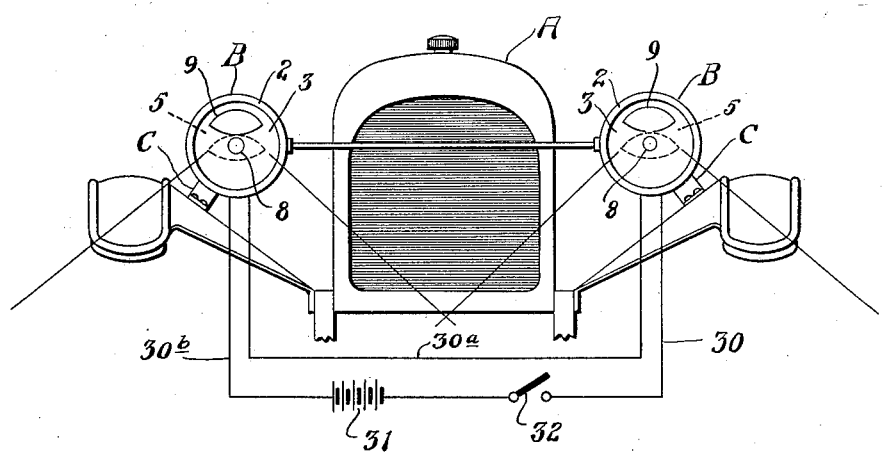
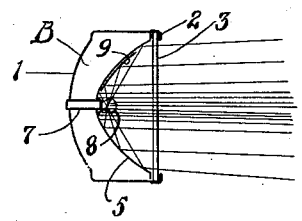
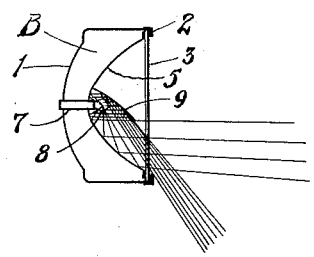
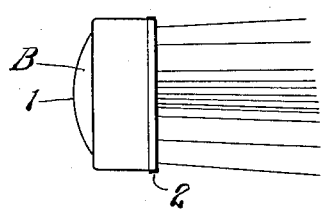
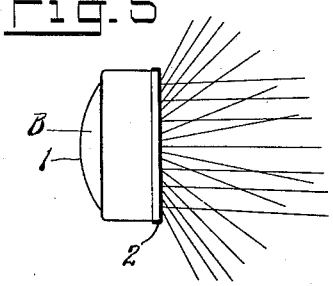
INVENTOR
Edith S. Gerry
BY
Harry D. Nims,
ATTORNEY

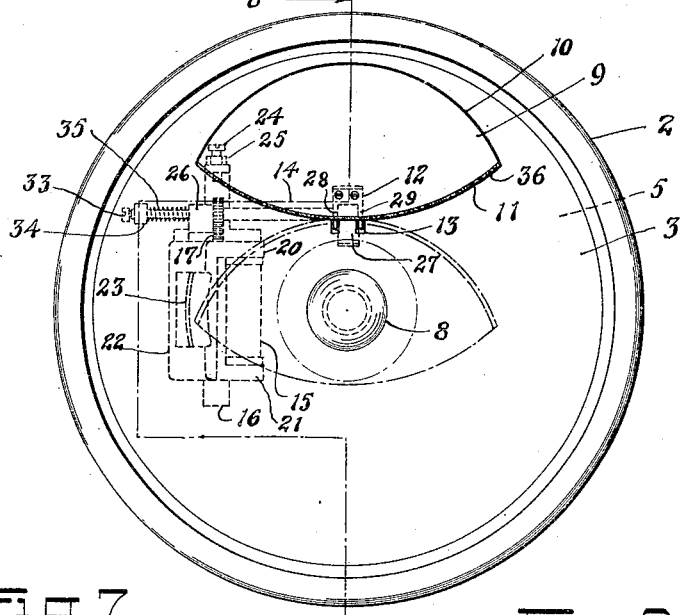
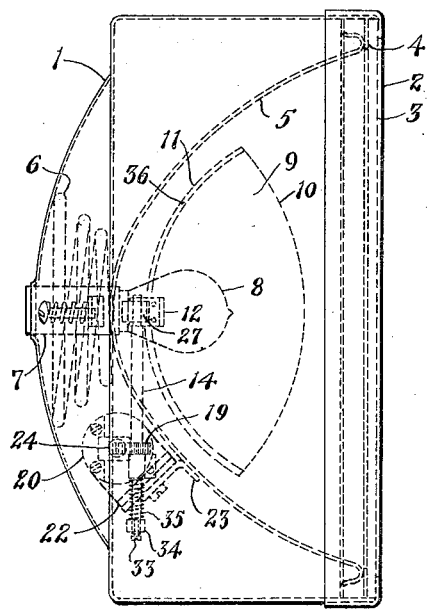
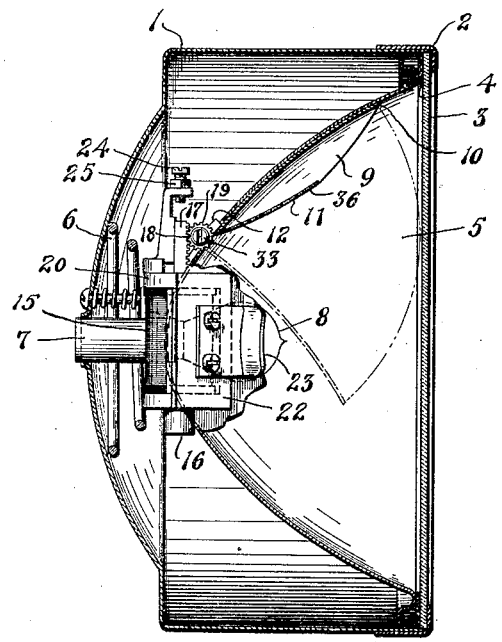

May 26, 1931.  E. S. GERRY  1,806,897
HEADLIGHT FOR AUTOMOBILES
Filed May 25, 1929  3 Sheets-Sheet 3
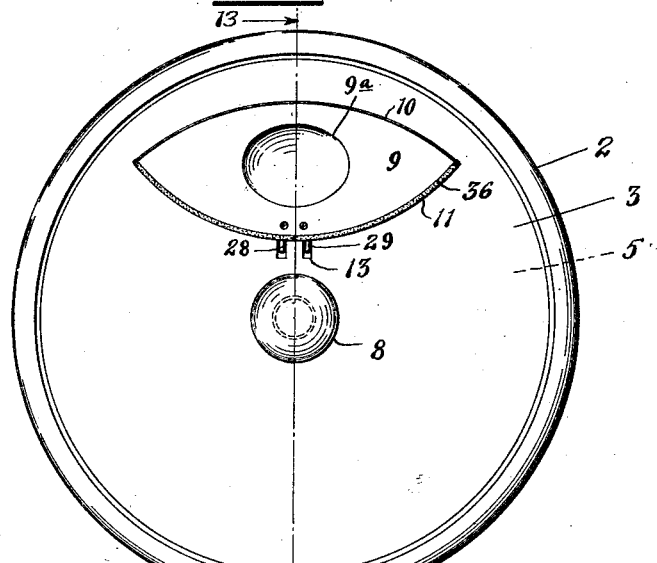
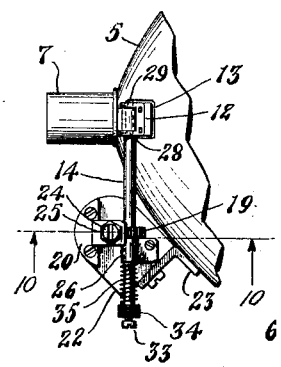
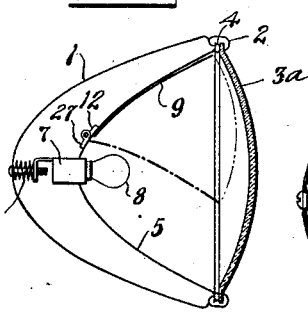
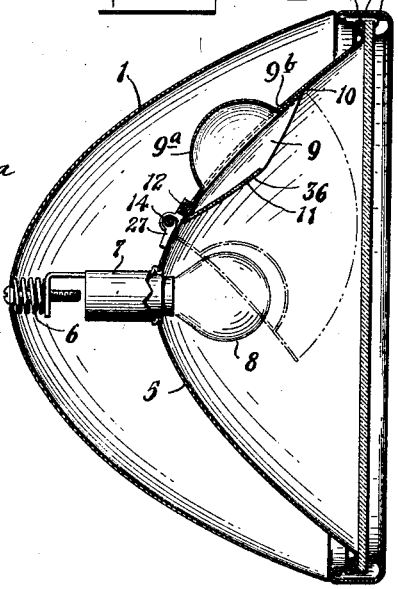
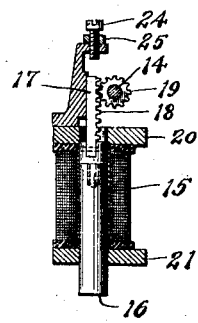
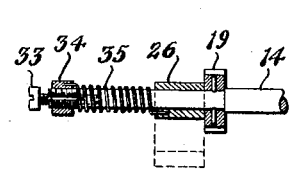
INVENTOR
Edith S. Gerry
BY
Harry D. Nims,
ATTORNEY Patented May 26, 1931

1,806,897

UNITED STATES PATENT OFFICE

EDITH S. GERRY, OF WARWICK, RHODE ISLAND

HEADLIGHT FOR AUTOMOBILES

Application filed May 25, 1929. Serial No. 365,926.

This invention relates to headlights for automobiles and has for its primary object the elimination of the glare which ordinary headlights cast into the eye of the approaching motorist.

Another object of the invention is to eliminate the glare of the ordinary headlight without materially shortening the beam of light.

Another object of the invention is to permit the passage of the lower rays of a beam of light projected from an ordinary headlight mounted on an automobile while intercepting the upper rays of the light beam and the rays from a circular area to the rear of the lamp concentric with the axis of the reflector of a diameter somewhat greater than that of the lamp from which concentrated rays parallel to the axis of the reflector are normally directed.

A further object of the invention is to deflect the upper rays of a beam of light projected from an ordinary headlight mounted on an automobile downwardly in such manner that they will increase the intensity of illumination immediately in front of the car and will spread outwardly at a wide angle and cause the roadway at each side of the automobile to be lit up for a considerable distance.

A still further object of the invention is to provide a glare eliminator device in combination with a headlight reflector which can be interchanged as a unit with the ordinary reflector of the same type of headlight.

The invention is illustrated by way of example in the accompanying drawings in which:

Figure 1 is a diagrammatic front elevation of an automobile having my improved headlight applied thereto.

Figures 2, 3, 4 and 5 are diagrammatic views showing the direction of the rays of light, Figures 2 and 4 being respectively a vertical section and a plan showing the normal direction of the rays and Figures 3 and 5 being respectively a vertical section and plan showing the direction of the rays when the glare is being eliminated.

Figure 6 is an enlarged front view of an automobile headlight in which the reflector is moderately deep, having my improvement applied thereto.

Figure 7 is a plan view of the headlight shown in Figure 6.

Figure 8 is a sectional view taken on the line 8—8 of Figure 6.

Figure 9 is a plan view of the operating mechanism of the glare eliminator.

Figure 10 is a sectional view taken on line 10—10 of Figure 9.

Figure 11 is a detail of the operating mechanism.

Figure 12 is an enlarged front view of an automobile headlight in which the reflector is fairly shallow, having my improvement applied thereto.

Figure 13 is a sectional view taken on line 13—13 of Figure 12.

Figure 14 is a diagrammatic view of a modified form of headlight having my improvement applied thereto.

The glare from the ordinary headlights used on automobiles causes many accidents on the road. This is due primarily to the fact that the upper rays of the beam of light projected by the reflector and the rays from a circular area to the rear of the lamp concentric with the axis of the reflector of a diameter somewhat greater than that of the lamp from which concentrated rays parallel to the axis of the reflector are normally directed, interfere with the vision of the approaching motorist so that he is temporarily blinded and his driving for a few moments is largely instinctive. A large number of cars are provided with "dimmers" but these are not satisfactory as when they are turned on and the bright lights shut off the driver requires a few moments for his eyes to become accustomed to the diminished illumination. This usually causes a considerable slackening in speed and sometimes results in the driver going off the shoulder of the road into a ditch or gully at the side.

Glare eliminators of the shutter type have been heretofore proposed but these have been ineffectual in cutting off all of the blinding rays of the beam of light for the reason that they only partially intercept such rays. In some of such devices the glare eliminator extends down only to the center of the lamp while in others the eliminator extends down as far as the lower edge of the lamp. Consequently, such eliminators do not intercept all of the strongest of the blinding light rays since these rays are projected from a circular area at the rear of the reflector concentric with the axis of the lamp which, though relatively small, is of larger diameter than that of the lamp. The rays from this area must be completely intercepted by the eliminator if the device is to be effective and to cover this area it is necessary for the shutter of the eliminator to extend downwardly below the lower edge of the lamp. The distance which it must extend below the lower edge of the lamp will be determined by the depth and style of the reflector.

Another important feature that early experimenters appear to have overlooked in the development of the eliminators of the shutter type is the necessity of having the edge of the shutter, which is lower-most when the shutter is in its raised position so shaped that when the shutter is in lowered position this edge will conform to the curve of that portion of the reflector lying to the rear of and at the sides of the lamp so that the passage of light rays from beneath or around the shutter and subsequent reflection of such rays from the upper part of the reflector will be prevented. The end of the curve of contact of the shutter with the reflector should preferably extend below the horizontal plane passing through the axis of the lamp.

The important features set forth above have been incorporated in the present invention as will be hereinafter more fully explained with references to the drawings. Further, in order for a device of this kind to be practical commercially it must have a simple and reliable operating mechanism such as that provided in connection with this invention.

Referring to Figures 1–11 of the drawings, (A) indicates an automobile having two headlights (B) supported from the front mudguards by means of brackets (C) in the usual manner. Each headlight (B) comprises a housing (1) having a lens rim (2) at its open end adapted to be removed and carrying a lens (3). A parabolic reflector (5) is mounted within the housing (1) and the front rim of said reflector is held flush with the lens (3) by means of a spring (6) disposed between the back of the reflector and the housing therefor. A packing (4) is provided between the forward rim of the reflector (5) and the lens (3) to protect the lens. The reflector (5) is provided with the usual lamp (8) mounted in a socket (7) at its center and rear. The glare eliminator consists of a moveable reflector or shutter (9) having a configuration conforming to the upper part of the parabolic reflector (5) and having curved upper and lower edges (10) and (11). This shutter (9) is pivoted to the reflector (5) at its lower edge by means of a member (12) which extends rearwardly through a U-shape slot (13) in the reflector and which is rigidly mounted on a shaft (14) mounted on the rear of the reflector. Operating mechanism for the shutter is preferably mounted on the rear of the reflector within the housing (1) and is connected to the shutter by means of the shaft (14).

When the shutter (9) is turned about its pivot into its glare-eliminating position it assumes a position indicated in dotted lines in Figures 6 and 8 of the drawings. The outline of the shutter is substantially elliptical, the longer axis thereof extending in a horizontal direction and the lower edge (11) of said shutter being so shaped that when the shutter is lowered into its glare-eliminating position sloping downwardly and forwardly said edge will conform to the curve of the reflector. The depth of the shutter is such that when it is in its lowered position the lower forward edge thereof will extend below the lower portion of the lamp, and the width of such shutter is such that the ends of the curve of contact of the lower edge with the reflector will preferably extend below a horizontal plane passing through the axis of the lamp. Such a shutter when in its lowered position will consequently intercept all of the light rays which would normally be reflected from the upper portion of the reflector and will also intercept all the light rays which would normally be reflected from a circular area to the rear of the lamp concentric with the axis of the reflector of a diameter somewhat greater than that of the lamp. Such shutter would also tend to deflect certain of the intercepted rays downwardly and outwardly in front of the car as shown diagrammatically in Figures 3 and 5 of the drawings. Owing to the rear edge of the shutter being so shaped that it conforms to the curve of that portion of the reflector lying to the rear of and at the sides of the lamp it will prevent the passage of light rays from beneath or around the shutter.

The operating mechanism comprises a solenoid (15) having a movable plunger (16) to the upper end of which a rack (17) is connected, the teeth (18) of which engage the teeth of a gear wheel (19) keyed to the shaft (14) which is connected at its opposite end to the shutter, as previously described. The solenoid (15) is mounted between the upper and lower arms (20) and (21) respectively of a U-shaped bracket (22) which also acts to complete a circuit for the lines of force. This bracket is fastened to the back of the reflector by an angle piece (23). The upward movement of the plunger is limited by a screw (24) provided with a lock nut (25) for fixing the screw after adjustment has been made. The shaft (14) is rotatably mounted in a bearing (26) mounted on the top of the U-shaped bracket (22). The opposite end of said shaft is mounted in a bearing (27) secured on the rear surface of the reflector and located between the two arms (28) and (29) of the member (12). The shutter (9) is connected to said member (12) adjacent the U-shaped slot (13) in the reflector.

The solenoid (15) is arranged in a circuit which includes the lead wires (30, 30a and 30b), the battery (31) and switch (32). The switch (32) is adapted to be operated from the driver's seat, and when the magnet coil is energized the plunger moves upwardly, causing the shaft (14) to rotate and the shutter to swing downwardly into its lowered position. The amount of swinging movement is defined by the screw (24) which is engaged by the upper end of the rack (17). The shutter will remain in this position until the coil is deenergized by the opening of switch (32) when it will be returned to its normal raised position by means of a coiled spring (35) which is located at the opposite end of said shaft, one end being connected to the shaft and the other being connected to the bearing (26).

The coiled spring (35) is preferably connected to the shaft (14) in an adjustable manner so that the tension thereof may be increased or decreased as desired. The connection is effected through the collar (34) to which one end of the spring is connected, such collar being in screw threaded engagement with the end of the shaft (14). Means are provided for locking said collar on the shaft in any position in which it may be adjusted, such means preferably comprising a tapered screw (33) engaged within the screw threaded hole in the end of the shaft, the end of the shaft being split so that by tightening the screw (33) it may be expanded into locking engagement with the collar (34).

The operating mechanism of the shutter (9) is preferably mounted on the rear of the reflector so that the reflector (5), shutter (9) and operating mechanism form a single unit which may be constructed to fit various types of headlights and made interchangeable with the reflectors so that the latter may be taken in exchange and used in the assembly of new units.

While the present embodiment of the invention describes and illustrates the shutter for eliminating the glare as a device separate from the reflector, the shutter may if desired be cut out of the reflector itself, the cut out portion being hinged to the shaft (14) as previously described.

The circuit for the magnet coils may be associated with the lighting circuit for the lamps and the switch (32) may be so arranged that in one position the lights are lit with the shutters in their raised position, in a second position the lights are lit with the shutters in their lowered position and in a third position the circuit both to the lamps and operating coils is broken.

In order that this invention may be adapted to headlights having shallow reflectors the upper portion of the shutter (9) may be provided with a substantially semi-spherical recess (9a) as shown in Figures 12 and 13 and the reflector (5) with a corresponding opening (9b) to accommodate the projecting portion forming the rear of said recess, when the shutter is in normal position. When the shutter is in operative position the recess (9a) receives the upper portion of the lamp at the forward end thereof thereby allowing of a greater angular movement of the shutter and consequently permitting the use of a much narrower shutter than would otherwise be possible as without said recess the forward edge of a shutter long enough to be effective in an ordinary headlight would be arrested in its downward movement by the lens of said headlight.

The periphery of the shutter is preferably provided with a thin covering of soft material (36) such as felt in order to protect the reflecting surface of the reflector from the effects of contact with the shutter when moved into operative position and also to silence the operation of the shutter.

It will be understood that the shape of the shutter will vary with the curvature of the reflector and will also vary as the glare area surrounding the lamp varies with the shape of the reflector.

In Figure 14 I have shown a modified form of headlight having my improvement applied thereto. I have found that a wider spread of light in front of the automobile may be secured by using a longer shutter which, when in lowered position, has a smaller angle of slope so that a greater portion of the reflected rays will clear the lower rim of the reflector. By means of a concave lens 3a as shown in Figure 14 a longer shutter may be used and this result achieved.

While I have described what I now believe to be the best embodiments of the invention I do not wish to be understood thereby as limiting the scope of the invention, as many changes and modifications may be made without departing from the spirit of the invention defined in the appended claim.

I claim:

In a headlight, a reflector of substantially parabolic form, a lamp located substantially in the focus of the reflector, a shutter forming part of the reflecting surface of the reflector pivotally mounted above the lamp, and means under the control of the operator for moving said shutter about its pivot comprising an electro-magnet coil, a movable plunger disposed within said coil adapted to be moved upwardly when the coil is energized, means for limiting the stroke of said plunger, a rotatable shaft split at one end thereof mounted on the rear of the reflector for operatively connecting said plunger to said shutter, internal and external threads on the split end of said shaft, a coiled spring on said shaft and connected thereto adjacent the split end thereof, adapted to rotate said shaft to return said plunger to its normal position when the coil is de-energized, means on said shaft for adjusting the tension of said coiled spring comprising a collar in screw threaded engagement with said shaft and means for locking said collar on said shaft comprising a tapered screw in screw threaded internal engagement with the split end of said shaft adapted to expand said shaft into locking engagement with said collar.

EDITH S. GERRY.